United States Patent
Barker et al.

(10) Patent No.: US 8,425,735 B2
(45) Date of Patent: Apr. 23, 2013

(54) FABRICATION OF PILLARED GRAPHENE

(75) Inventors: Delmar L. Barker, Tucson, AZ (US); William R. Owens, Tucson, AZ (US); John Warren Beck, Tucson, AZ (US)

(73) Assignees: Raytheon Company, Waltham, MA (US); The Arizona Board of Regents on Behalf of The University of Arizona, Tucson, AZ (US)

( * ) Notice: Subject to any disclaimer, the term of this patent is extended or adjusted under 35 U.S.C. 154(b) by 295 days.

(21) Appl. No.: 12/974,141

(22) Filed: Dec. 21, 2010

(65) Prior Publication Data
US 2012/0152725 A1  Jun. 21, 2012

(51) Int. Cl.
*B01J 19/08* (2006.01)
*B01J 19/12* (2006.01)
*H05H 1/00* (2006.01)
*B82Y 40/00* (2011.01)
*C01B 31/02* (2006.01)

(52) U.S. Cl.
USPC ......... 204/157.44; 204/157.47; 977/847; 977/882; 977/896; 977/900; 977/901; 423/448

(58) Field of Classification Search ....... 204/157.44, 204/157.47; 977/847, 882, 896, 900, 901; 423/448
See application file for complete search history.

(56) References Cited

U.S. PATENT DOCUMENTS
2005/0075245 A1* 4/2005 Goddard et al. ............ 502/417
2011/0300063 A1* 12/2011 Phillips et al. ............ 423/648.1

OTHER PUBLICATIONS

Dimitrakakis et al, Pillared Graphene: A New 3D Innovative Network Nanostructure Augments Hydrogen Storage, AIP Conf. Proc. 1148, pp. 388-391 (2009).*
Varshney et al, "Modeling of Thermal Transport in Pillared-Graphene Architectures," ACS Nano, vol. 4, No. 2, pp. 1153-1161.*
Fan et al, "A Three-Dimensional Carbon Nanotube/Graphene Sandwich and Its Application as Electrode in Supercapacitors," Adv. Materials, (2010), vol. 22, pp. 3723-3728.*
Zhang et al, "Pillaring chemically exfoliated graphene oxide with carbon nanotubes for photocatalytic degradation of dyes under visible light irradiation," ACS Nano, vol. 4, No. 11, pp. 7030-7036.*
Lee et al., "Adatom-assisted structural transformations of fullerenes," Applied Physics Letters 88, 011913 2006, pp. 1-3.
Ouyang et al., "Chemical Functionalization of Graphene Nanoribbons by Carboxyl Groups on Stone-Wales Defects," J. Phys. Chem. C 2008, 112, pp. 12003-12007.
Yumura et al., "Confinement effects on site-preferences for cycloadditions into carbon nanotubes," Chemical Physics Letters 444 (2007) pp. 155-160.
Marczak et al., "Uniquely Shaped Double-Decker Buckyferroceness-Distinct Electron Donor-Acceptor Interactions," J. Am. Chem. Soc. 2008, 130, pp. 16207-16215.

(Continued)

*Primary Examiner* — Keith Hendricks
*Assistant Examiner* — Colleen M Raphael
(74) *Attorney, Agent, or Firm* — Eric A. Gifford (57) ABSTRACT

A method of fabricating pillared graphene assembles alternate layers of graphene sheets and fullerenes to form a stable protostructure. Energy is added to the protostructure to break the carbon-carbon bonds at the fullerene-to-graphene attachment points of the protostructure and allow the bonds to reorganize and reform into a stable lower energy unitary pillared graphene nanostructure in which open nanotubes are conjoined between graphene sheets. The attachment points may be functionalized using tether molecules to aid in attachment, and add chemical energy to the system. The arrangement and attachment spacing of the fullerenes may be determined using spacer molecules or an electric potential.

21 Claims, 9 Drawing Sheets

OTHER PUBLICATIONS

Graeme Ackland, "Controlling Radiation Damage," www.sciencemag.org Science, vol. 327, Mar. 26, 2010, pp. 1587-1588.

Yoshimoto et al, "Epitaxial Supramolecular Assembly of Fullerenes Formed by Using a Coronene Template on a Au(111) Surface in Solution," J. Am. Chem. Soc. 2007, 129, pp. 4366-4376.

Jiang et al., "First principles study of the graphene/Ru(0001) interface," The Journal of Chemical Physics 130, 074705, 2009, pp. 1-5.

Mateo-Alonso et al., "Functionalization and applications of [60]fullerene," Carbon Nanotechnology Edited by Liming Dai, © 2006 Elsevier B.V, pp. 155-189.

Sutter et al., "Graphene growth on polycrystalline Ru thin films," Applied Physics Letters 95, 133109, 2009, pp. 1-3.

Xuesong et al., "Large-Area Synthesis of High-Quality and Uniform Graphene Films on Copper Foils," Jun. 5, 2009 vol. 324, Science, www.sciencemag.org, pp. 1312-1314.

Han et al., "Microscopic mechanism of fullerene fusion," Physical Review B 70, 113402 (2004), pp. 1-4.

Liu et al., "Graphene-Based Supercapacitor with an Ultrahigh Energy Density," 2010 American Chemical Society, Nano Lett. 2010, 10, pp. 4863-4868.

Deng et al., New Alkali Doped Pillared Carbon Materials Designed to Achieve Practical Reversible Hydrogen Storage for Transportation, Physical Review Letters, vol. 92, No. 16, Apr. 23, 2004, pp. 1-4.

Pupiovskis et al., New Route for [60]Fullerene Functionalisation in [4+2] Cycloaddition Reaction Using Indene, Tetrahedron Letters, vol. 38, No. 2, pp. 285-288, 1997.

Wu et al., "Periodic Graphene Nanobuds," Nano Letters 2009, vol. 9, No. 1, pp. 250-256.

Dimitrakakis et al., "Pillared Graphene: A New 3-D Network Nanostructure for Enhanced Hydrogen Storage," Nano Letters 2008, vol. 8, No. 10, pp. 3166-3170.

Bai et al., "Efficient Annealing of Radiation Damage Near Grain Boundaries via Interstitial Emission," www.sciencemag.org Science, vol. 327, Mar. 26, 2010, pp. 1631-1634.

A. F. Shestakov, "Reactivity of Fullerene C60," Russian Journal of General Chemistry vol. 78 No. 4 2008, pp. 811-821.

Bai et al., "Efficient Annealing of Radiation Damage Near Grain Boundaries via Interstitial Emission," www.sciencemag.org/cgi/content/full/327/5973/1631/DC1, Mar. 26, 2010, Science 327, 1631 (2010), pp. 1-15.

Gao et al., "Tunable interfacial properties of epitaxial graphene on metal substrates," Applied Physics Letters 96, 053109, 2010, pp. 1-3.

Puech et al., "Ultraviolet photon absorption in single- and double-wall carbon nanotubes and peapods: Heating-induced phonon line broadening, wall coupling, and transformation," Physical Review B 76, 054118, 2007, pp. 1-4.

* cited by examiner

○ CARBON ATOMS 56
● OXYGEN ATOMS 58
◌ HYDROGEN ATOMS 60

FABRICATION OF PILLARED GRAPHENE

GOVERNMENT LICENSE RIGHTS

This invention was made with Government support under contract number DMR-1148936 awarded by the National Science Foundation, Division of Materials Research. The Government has certain rights in this invention.

BACKGROUND OF THE INVENTION

1. Field of the Invention

This invention relates to 3-D nanostructures, and more particularly to the fabrication of pillared graphene.

2. Description of the Related Art

Figure 1:
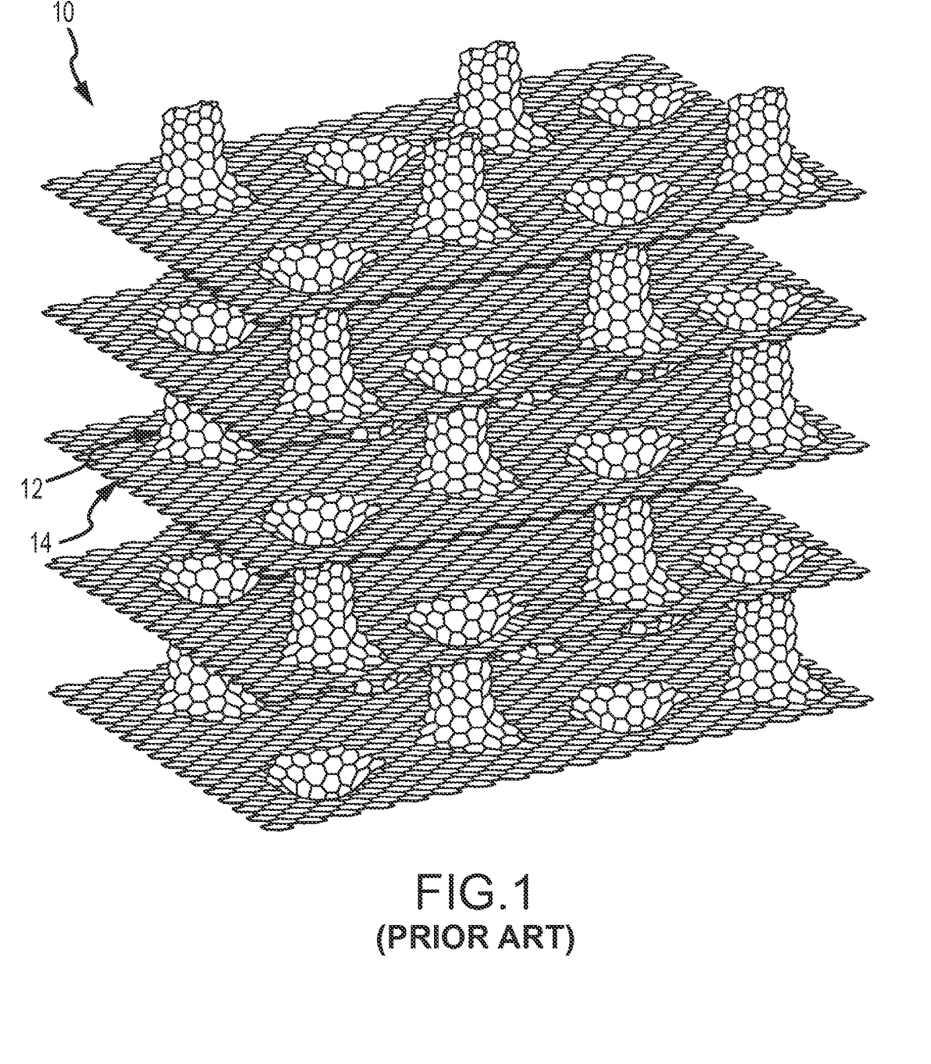
FIG. 1, as described above, is a perspective view of pillared graphene.

Pillared Graphene: A New 3-D Network Nanostructure for Enhanced Hydrogen Storage, Georgios K. Dimitrakakis et al, Nano Letters 2008, 8 (10) 3166-3170 Sep. 19, 2008 presented a novel 3-D carbon nanostructure for hydrogen storage. As shown in FIG. 1, a "pillared graphene" structure 10 includes arrays of open carbon nanotubes 12 that join sheets of graphene 14. The structure and analysis were a theoretical investigation to prove that CNTs and graphene sheets can be combined to form a 3-D nanostructure capable of enhancing hydrogen storage. The paper went on to state, "Experimentalists are challenged to fabricate this material and validate its storage capacity."

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method of fabricating pillared graphene.

Pillared graphene is a carbon heterostructure comprised of an oriented array of open carbon nanotubes connected on each end to a sheet of graphene around the perimeter of the open nanotubes. Pillared graphene is fabricated by first constraining a layer of fullerenes between graphene sheets to form a "protostructure". Tether molecules may be employed to help chemically bind the fullerenes to the graphene at the attachment points. Energy is applied to the protostructure via chemical reaction, thermal or radiative processes to break the carbon-carbon double bonds and open holes in the fullerenes and the graphene sheets at the attachment points. The fullerenes and graphene near the attachment points reorganize their carbon-carbon bonds via cycloaddition reactions resulting in the establishment of fullerene-to-graphene bonds around the perimeter of the holes and reorganization of their carbon-carbon bonds to form open nanotubes that are conjoined between the pair of graphene sheets in a pillared graphene nanostructure. Energy for bond reorganization may come from either chemical reaction of the tether molecules with other chemical species present during fabrication and/or from adsorption or scattering of energetic atom, electron or photon radiation to which the protostructure is exposed.

Chemical functionalization using tether molecules at the attachment points aids in the attachment of the fullerenes to the graphene and adds energy to the protostructure effectively lowering (or possibly overcomes) the energy barrier to break the carbon-carbon double bonds. This both lowers the amount of additional energy that must be applied to break the bonds at the attachment points and reduces the chance that other bonds not at the attachment point are broken causing random disordering of the structures. The protostructure may be functionalized before, during or after layer assembly. For example, a tether molecule A attached to fullerene and a tether molecule B attached to graphene react chemically when contacted to form a lower energy state molecule C.

The arrangement and spacing between fullerenes may be set before, during or after layer assembly to define the protostructure. One approach is to attach spacer molecules between the fullerenes, the chemistry of the fullerenes and spacer molecules dictating the arrangement and attachment spacing of the fullerenes. Another approach is to create a periodic electric potential in one or both of the graphene sheets that dictates the arrangement and attachment spacing of the fullerenes.

Larger 3-D structures may be fabricated by, for example, providing the initial protostructure with additional alternating layers of fullerenes and graphene sheets and forming the final structure in one step, forming pairs of pillared graphene structures, constraining another layer of fullerenes between the pair and repeating the process or by adding fullerenes and graphene one layer at a time to the initial pair. Layer assembly may be performed by manual placement of the fullerenes or, for example, via a self-assembly process. The composition of the graphene or fullerenes may vary layer-to-layer. Within a layer, the fullerene composition should be fairly uniform to provide reliable contact at the attachment points. The uniformity specification will depend on the density of the fullerenes and the rigidity of the graphene. The graphene or fullerenes may be doped prior to, during or after layer assembly.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a method of fabricating pillared graphene that meets the challenge directed to experimentalists by the Dimitrakakis paper. Our approach assembles alternate layers of graphene sheets and fullerenes to form a stable but high energy composite system in the form of a "protostructure". We add energy to the system to break the carbon-carbon bonds at the attachment points and allow them to reorganize and reform into a stable lower energy unitary pillared graphene nanostructure in which open nanotubes are conjoined between graphene sheets.

Referring now to drawings, FIGS. 2a through 2d illustrate the core process for fabrication of the simplest pillared graphene nanostructure comprising a single layer of open nanotubes conjoined between a pair of graphene sheets. The same principles may be used to fabricate more complex nanostructures including three or more graphene sheets and two or more fullerene layers assembled in alternating fashion. These more complex nanostructures may be fabricated in one parallel process or in a serial process by fusing simpler pillared graphene nanostructures. The fullerene composition may vary from layer-to-layer. Likewise, the isotope composition of the graphene may vary from layer-to-layer. The graphene or fullerenes may be doped with a uniform or varying doping scheme prior to, during or after layer assembly with a variety of dopants such as but not limited to B, N, Bi, P, K, Cs, Na, Li, O, F, H, Pb, U, Fe, Co, Mo, Mn, for the purpose of either electron or electron hole doping, or for the purpose of modulating phonon transport. Doping will be performed using batch chemical exposure, chemical vapor deposition, plasma-assisted chemical vapor deposition, or ion implantation. The core process may be augmented with other techniques to improve the fusion of the fullerenes to form the conjoined nanotubes or to control the arrangement and spacing of the fullerenes.

Graphene is a one-atom thick planar sheet of sp2-bonded carbon atoms that are densely packed in a honeycomb crystal lattice. Graphene may be fabricated from natural carbon isotopes or from a carbon feedstock enriched in either $12C$ or $13C$. The feedstock may be filtered to control the isotope composition. Single layer graphene layers may be made in a variety of ways including epitaxial growth by CVD or ion implantation, or by supercritical fluid delamination from graphite, or via some other method.

A fullerene is a molecule composed entirely of sp2-bonded carbon atoms that are densely packed in a crystal lattice taking the form of a hollow sphere. The crystal lattice includes both hexagonal and pentagonal rings. The smallest stable fullerene in which no two pentagons share an edge is $C_{60}$, and as such it is also the most common type of fullerene. $C_{60}$ is also known as Buckminsterfullerenes, or more commonly, "buckyballs." Another fairly common fullerene is $C_{70}$ but fullerenes with 72, 76, 84 and up to 100 carbon atoms exist. The diameter of the fullerene varies with the number of carbon atoms.

Figure 2A:
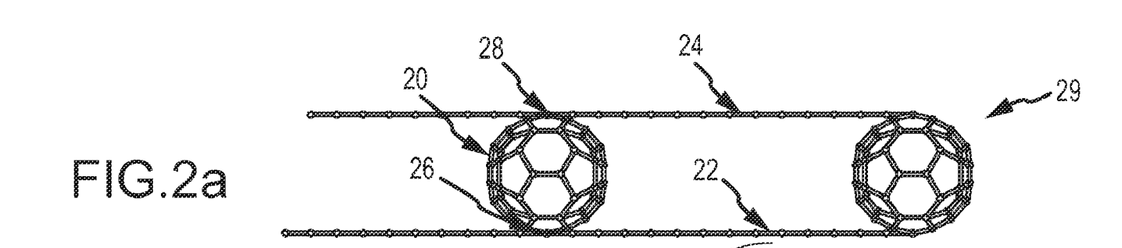
FIGS. 2a through 2d are a sequence of drawings illustrating an embodiment for the fabrication of pillared graphene.

As shown in FIG. 2a, a layer of fullerenes 20 is constrained between layers of graphene sheets 22 and 24 at attachment points 26 and 28 to form a protostructure 29. Each graphene layer may comprise a single graphene sheet or a few graphene sheets up to approximately ten sheets. The composition of fullerenes 20 in the layer is preferably of a substantially uniform type to ensure a substantially uniform spacing between the graphene sheets. The specification on the composition e.g. at least 90% $C_{60}$ for example is determined by the density of the fullerenes and the rigidity of the graphene to ensure solid contact at the attachment points. The layers may be assembled, for example, manually or via a "self-assembly" process.

Protostructure 29 is characterized by a Gibbs Free Energy (GFE). The protostructure has an inherently higher GFE than pillared graphene because of the bending stress (curvature) in the fullerene bonds relative to their preferred planar orientation. Reorganization of the protostructure to the pillared graphene form results in reduction of total curvature, a lower GFE, and thus a more energetically favorable state. However, the fullerenes' carbon-carbon double bonds present an energy barrier that prevents such a reorganization from occurring spontaneously. We apply energy to the protostructure to overcome this activation energy barrier, allowing reorganization to the pillared graphene nanostructure. Note, the desired pillared graphene nanostructure is not the lowest GFE state as significant curvature still remains in the pillars. Therefore care must be taken to selectively and controllably apply the energy to the attachment points to properly reorganize the carbon-carbon bonds.

Figure 2B:
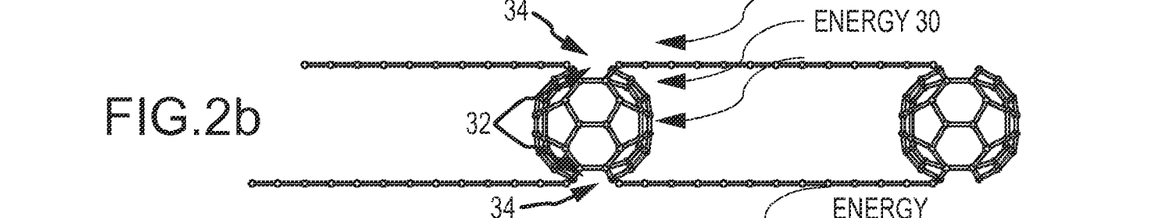
Figure 2C:
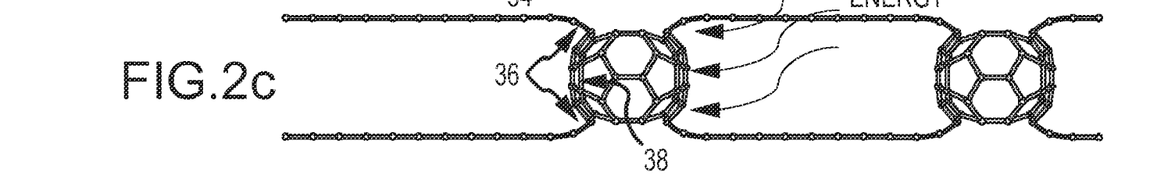
Figure 2D:
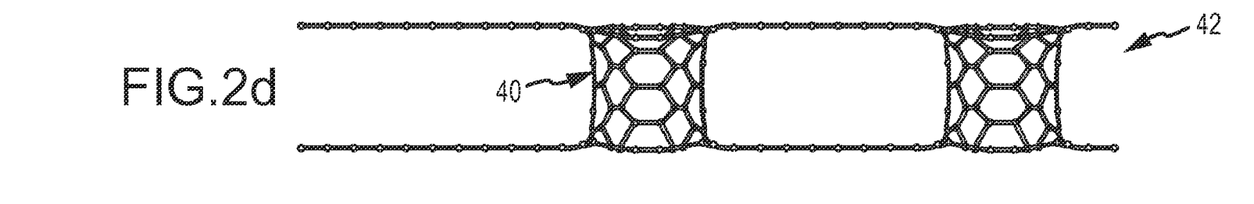
Figure 3A:
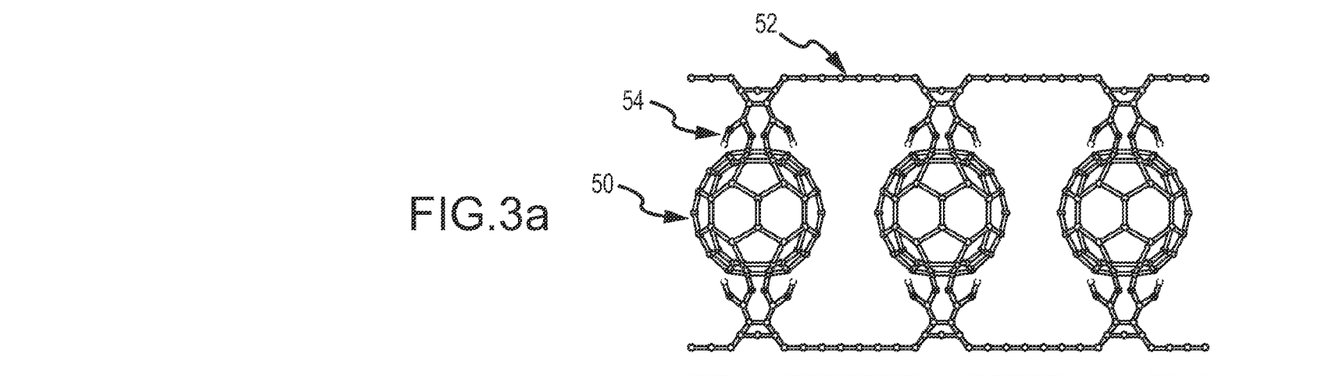
FIGS. 3a through 3e are a sequence of drawings illustrating an embodiment for the fabrication of pillared graphene by functionalizing the attachment points between the fullerenes and graphene sheets with tether molecules.
Figure 3B:
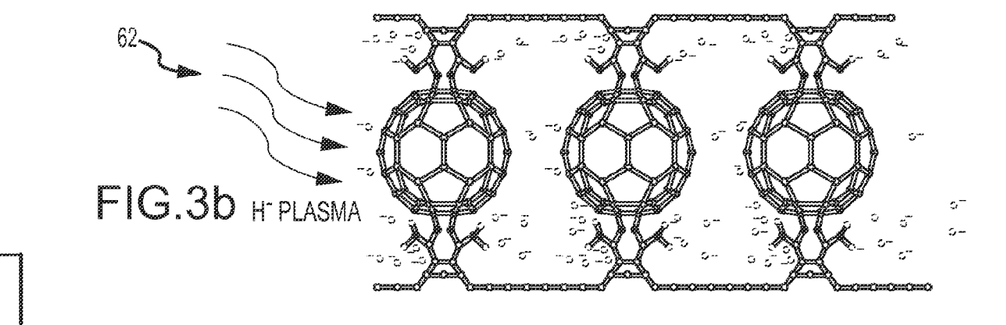
Figure 3C:
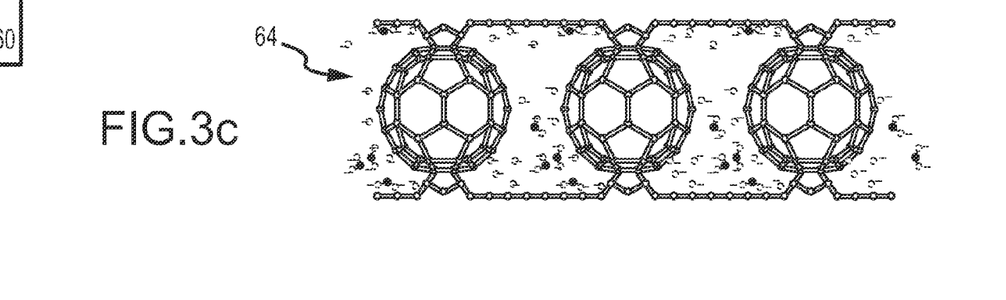
Figure 3D:
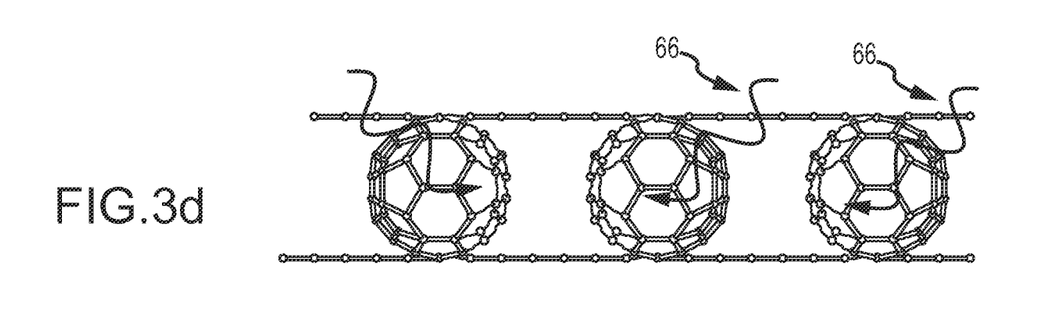
Figure 3E:
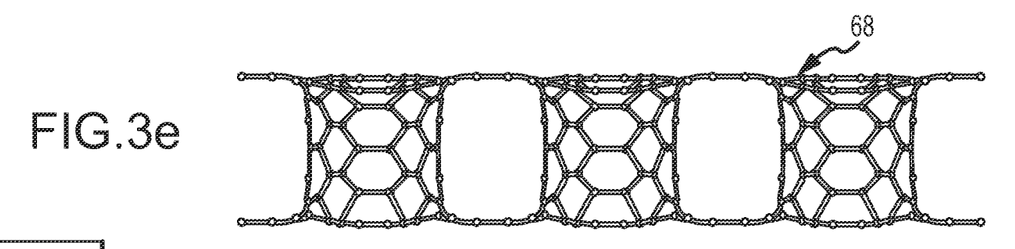
Figure 4A:
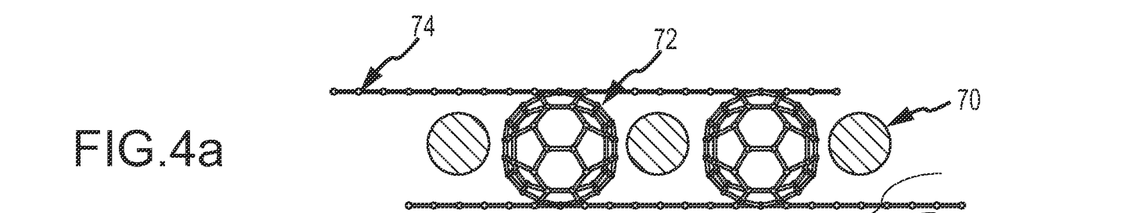
FIGS. 4a through 4d are a sequence of drawings illustrating an embodiment for the fabrication of pillared graphene by attaching spacer molecules between fullerenes.
Figure 4B:
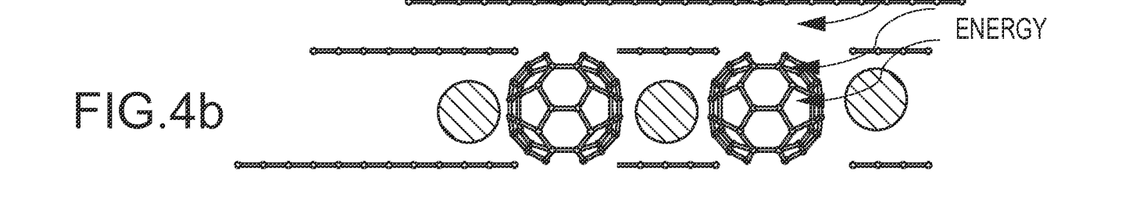
Figure 4C:
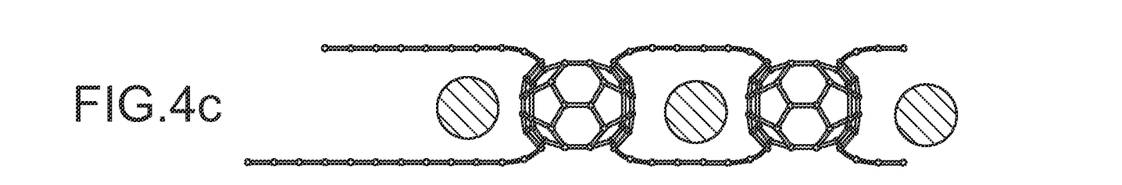
Figure 4D:
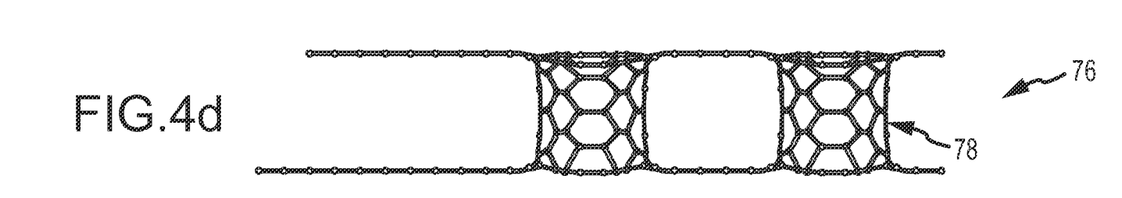

As shown in FIGS. 2b and 2c, energy 30 is applied via chemical, thermal and/or electron/photonic/atomic radiation processes to break the carbon-carbon double bonds and open holes 32 and 34 in the fullerenes and the graphene sheets at the attachment points. As shown in FIG. 2d, the fullerenes reform carbon-carbon bonds 36 to the graphene sheets around the perimeter of the holes and reorganize their carbon-carbon bonds 38 within the fullerenes to form open nanotubes 40 that are conjoined between the pair of graphene sheets in a stable unitary pillared graphene nanostructure 42. The application of energy overcomes the barrier presented by the fullerene's carbon-carbon double bonds allowing the stable, higher energy protostructure 29 of graphene and fullerenes to reorganize into the more stable, lower energy unitary pillared graphene nanostructure 42. In this process, the carbon-carbon bonds reorganize from a closed spherical geometry of the fullerene 20 that exhibits high energy due to the curvature to a lower energy open cylindrical geometry of the nanotube 40.

Chemical functionalization using small tether molecules may be used to help conjoin the fullerenes and graphene into the protostructure form. Reaction of these molecules with other molecules present during conversion from the protostructure to pillared graphene can add energy at the attachment points helping to overcome the activation energy for bond local reorganization of the carbon-carbon double bonds. These small tether molecules may be selected from but not limited to $O_2$, $O_3$, $Cl^-$, $CH3'-$, $CH4$, $C-$, $O-$, $H+$, $H_2O$, $OH^-$, $NH_3^-$ benzenethiol, diphenyl disulfide, carboxyl, amine, ferrocene, colbaltocene, or nickleocene.

In an embodiment, hydroxyl adduct tether molecules may be added to fullerenes prior to attachment to graphene to form the protostructure. The protostructure may be exposed to a hydrogen ion plasma that reacts with the hydroxyl tether molecules to form $H_2O$. Some of the energy of this reaction excites adjacent carbon bonds in the fullerene protostructure. If sufficient energy is added some of the Carbon-Carbon bonds near the attachment points may break and recombine to form Carbon-Carbon bonds between the fullerenes and graphene sheets. This process can be aided by the addition of energy during tether molecule reaction, either by converting to pillared graphene at high temperature, or by bombarding the protostructure with energetic atoms, electrons or photons during tether molecule reaction. The protostructure may be functionalized with tether molecules before, during or after layer assembly.

In an embodiment, a different type of tether molecule A and B are attached to the graphene and fullerenes. When attached, molecules A and B react with each to produce a lower energy configuration molecule C, and react in such a way that some of the energy released by the reaction of A+B to form C will go into exciting the Carbon-Carbon bonds adjacent to the tether molecules. This either lowers the activation energy barrier or excites the bonds enough to break these adjacent molecules. The reaction of the A & B tether molecules may be assisted by providing an additional energy source, either from UV light, or from electron bombardment, to cite two examples, such that the sum of the energy released by the reaction of A+B to form C and the energy from the absorbed particle (photon or electron) is sufficient to break the Carbon-Carbon bonds adjacent to the tether molecule complex. Preferably, a class of tether molecules is used in the reaction such that the reactant (C molecules) will unbind from the graphene and fullerene components, after reaction leaving behind only the now bonded open nanotubes and graphene. Once a single Carbon-Carbon bond has been established between a fullerene and graphene sheet, cycloaddition reactions will allow additional Carbon-Carbon bonds to form between the fullerenes and graphene sheets, and may be stimulated to do so by additional photon or electron energy absorption. Such cycloaddition reactions, will require less energy than the establishment of the original bonds, and thus may proceed without disrupting bonds other than the ones involved in cycloaddition.

Referring now to the drawings, FIGS. 3a through 3e illustrate an embodiment of fullerene 50 attachment to graphene 52 via carboxyl tether molecule 54 attachment followed by hydrogen plasma exposure and energetic photon or electron exposure to provide the energy for bond reorganization. Functionalizing of fullerenes will occur prior to assembly with graphene sheets. For example, a chemical process that causes carboxylation of fullerenes may be used to add carboxyl (COOH) groups to the fullerenes prior to attachment to the graphene sheets. If hydroxyl tether molecules 54 are used they may be attached to the fullerenes 50 prior to assembly with graphene 52 using one of many standard methods of chemical reaction, such as reaction of the fullerenes with hydrogen peroxide and ammonium hydroxide at elevated temperature. Tether molecules 54 comprise carbon atoms 56, oxygen atoms 58 and hydrogen atoms 60.

Once assembled with graphene, this protostructure may be reacted with $H^-$ (hydrogen ion) plasma 62 to react the carboxyls or hydroxyls with the graphene 52 with $H_2O$ formed as a removable byproduct. Some of the energy of $H_2O$ formation is transferred to the dangling bonds of the graphene and fullerene as the $H_2O$ molecules form and desorb, resulting in excitation and bonding between the graphene and fullerene around the perimeter of the holes by cycloaddition 64. Subsequent exposure to energetic particles 66 such as UV or soft x-ray photons, electrons or atomic ions result in excitation of the carbon-carbon bonds 66 of the graphene or fullerene structure. Where the excited wave functions overlap sufficiently the C—C bonds will reorganize into lower energy configurations. Following successive excitations, the structure will reorganize into the relatively low energy configuration or configurations of pillared graphene 68.

There is evidence that fullerenes spontaneously self assemble into an ordered array on the graphene sheet. However, the arrangement and attachment spacing between fullerenes may be set by other means before, during or after layer assembly to define the pillared graphene structure. As shown in FIGS. 4a through 4d, one approach is to attach spacer molecules 70 between the fullerenes 72 that are constrained between graphene sheets 74. The chemistry of the fullerenes and spacer molecules dictating the arrangement and attachment spacing of the fullerenes. The chemistry of the fullerenes and spacer molecules is suitably performed prior to constraining the fullerenes between the graphene. Examples of suitable spacer molecules include but are not limited to other fullerenes without tether molecules, oligothiophene molecules, oligothienylevinylene molecules or polystyrene molecules. The spacer molecules may remain or may be detached as free molecules dissipate in an outgassing processed in a vacuum environment during reorganization of the bonds. As a result, the final unitary pillared graphene nanostructure 76 can be designed to have a particular arrangement and spacing of open nanotubes 78 conjoined between graphene sheets 74.

Figure 5:
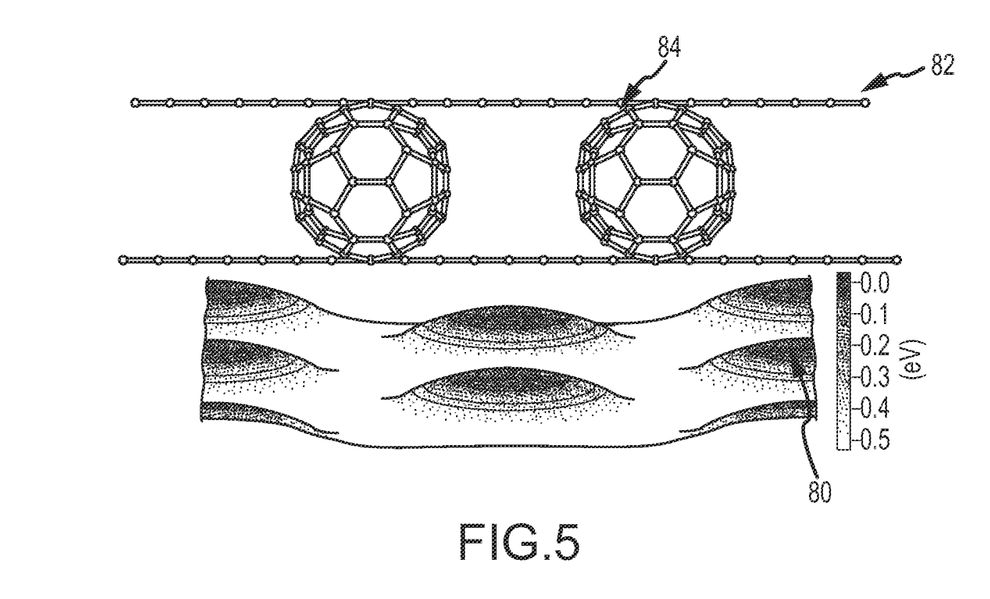
FIG. 5 is a drawing illustrating the control of fullerene spacing by application of a periodic electric potential to one of the graphene sheets.

Another approach for setting the arrangement and attachment spacing is to create a periodic electric potential 80 in one or both of the graphene sheets 82 that dictates the arrangement and attachment spacing of the fullerenes 84 as shown in FIG. 5. A periodic potential can be established by growing the graphene layers on metals such as Ru, Ir, or Pt, which generates periodic flexural folds in the graphene. These folds in turn generate a periodic electric potential on the graphene surface with differing periods and patterns depending on the growth substrate. The fullerenes, which have very high electron affinity, will self assemble into the same pattern defined by the graphene periodic potential, by attachment to the zones of the graphene surface having highest (negative) electric potential. Spacing and alignment of subsequent fullerene layers will be dictated by the arrangement taken by those in the basal fullerene layer because this layer will generate a periodic potential on the next layer of graphene attached, and so forth.

For simplicity and clarity, the fabrication of pillared graphene has been described for the simplest pillared graphene structure of an array of open nanotubes conjoined between a pair of graphene sheets. The same principles may be used to fabricate more complex nanostructures including three or more graphene sheets and two or more fullerene layers assembled in alternating fashion. These more complex nanostructures may be fabricated in one parallel process or in a serial process by fusing simpler pillared graphene nanostructures, either one additional layer of fullerenes and graphene or an additional layer of fullerenes and another simple pillared graphene nanostructure.

Figure 6:
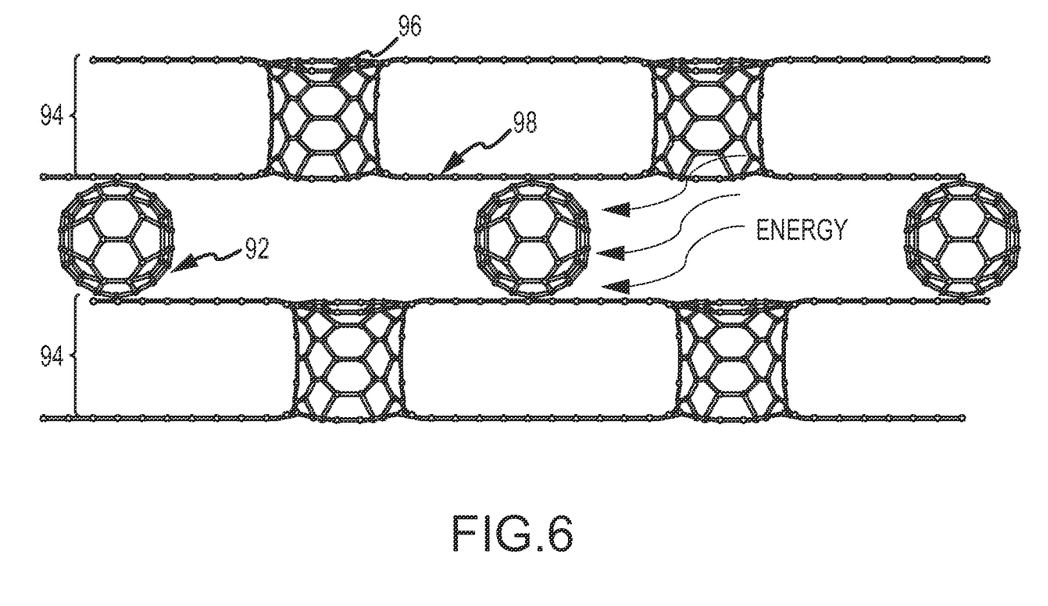
FIG. 6 is a drawing of an embodiment for sequential fabrication of multilayered pillared graphene.

Referring now to the drawings, as shown in FIG. 6, a more complex pillared graphene structure is fabricated by placing a layer of fullerenes 92 between a pair of previously fabricated pillared graphene structures 94, each of those comprising a layer of open nanotubes 96 conjoined between a pair of graphene sheets 98. As before, energy is added to the system to break the carbon-carbon bonds at the attachment points to allow the carbon-carbon bonds to reorganize and reform between graphene sheets 98 and fullerenes 92 to conjoin the two pillared graphene structures 94 to form the more complex pillared graphene structure 90. As before, the fullerenes may be functionalized using tether molecules or arranged using spacer molecules or electric potential.

Figure 7:
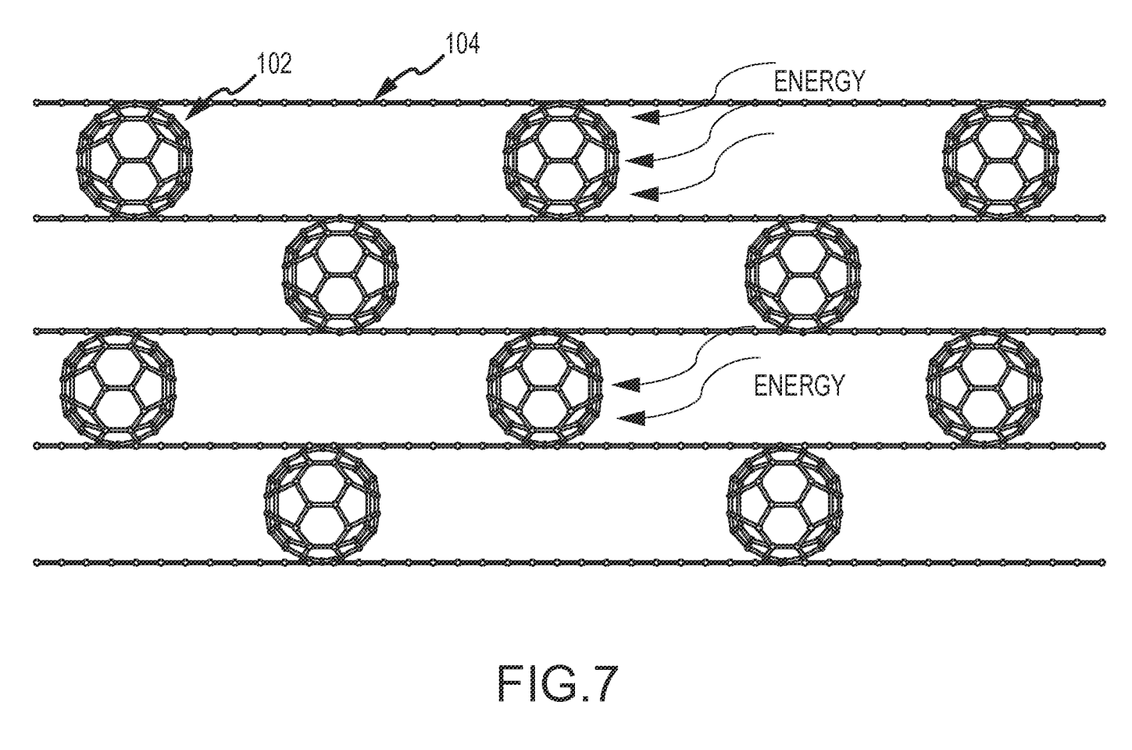
FIG. 7 is a drawing of another embodiment for parallel fabrication of multilayered pillared graphene.

As shown in FIG. 7, a more complex pillared graphene structure 100 is fabricated by alternating layers of fullerenes 102 and graphene sheets 104. As before, energy is added to the system to break the carbon-carbon bonds at the attachment points to allow the carbon-carbon bonds to reorganize and reform between graphene sheets 104 and fullerenes 102. In this case, all of the layers are processed in parallel to form the entire structure in one process. As before, the fullerenes may be functionalized using tether molecules or arranged using spacer molecules or electric potential.

Figure 8:
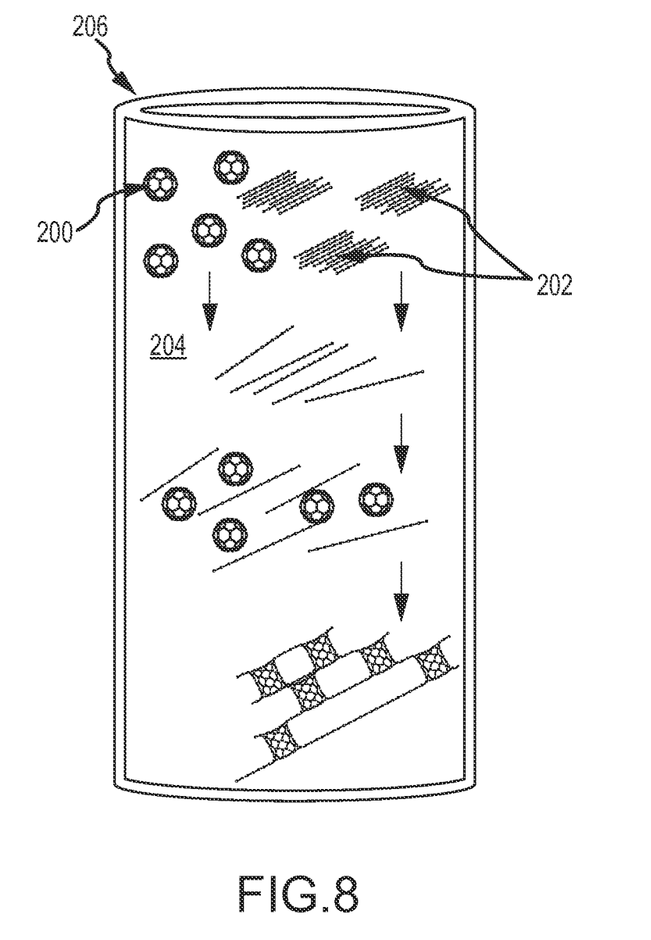
FIG. 8 is a drawing of an embodiment for fabrication of multilayered pillared graphene using self-assembly.

Self-assembly provides a bulk processing approach to constrain many fullerenes between a pair of graphene sheets or to constrain multiple layers of fullerenes between alternating layers of graphene. In an embodiment shown in FIG. 8, fullerenes 200 and graphite flakes 202 are mixed in a supercritical carbon-dioxide ($scCO_2$) solution 204 in a high-pressure bottle 206. The mixture may contain other accelerating compounds as well. As time proceeds, the dispersive action of the $scCO_2$ separates the graphite into graphene sheets. The fullerenes interpose themselves between graphene sheets. The scCO$_2$ solution is decompressed and allowed to escape constraining the fullerenes between sheets of graphene forming multilayer protostructure. Radiation and/or heat is applied to the bulk multilayer prostructure causing the material to self-assemble into pillared graphene. The fullerenes may be functionalized with tether and/or spacer molecules as described in the earlier process.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of pillared graphene fabrication, comprising:
   constraining one or more layers of multiple fullerenes between alternating layers of graphene sheets at attachment points; and
   applying energy to break carbon-carbon bonds and open holes in the fullerenes and the graphene sheets at the attachment points and chemically reform carbon-carbon bonds between the fullerenes and the graphene sheets around the perimeter of the holes to form open cylindrical nanotubes that are conjoined between the graphene sheets to form a stable unitary cylindrical pillared graphene nanostructure.

2. The method of claim 1, wherein prior to the application of energy, the fullerene layer has a substantially uniform composition of fullerenes.

3. The method of claim 2, wherein the substantially uniform composition of fullerenes comprises at least 90% of a single type of fullerene.

4. The method of claim 1, further comprising:
   setting attachment spacing between the fullerene molecules.

5. The method of claim 4, wherein the attachment spacing is set by chemically attaching spacer molecules between fullerenes.

6. The method of claim 4, wherein the attachment spacing is set by creating a periodic electric potential in at least one of said first and second graphene sheets.

7. The method of claim 1, wherein the fullerenes are constrained between graphene sheets using a self-assembly process in which,
   graphite is mixed with a super-critical carbon dioxide (scCO$_2$) solution to separate the graphite into graphene sheets;
   fullerenes are mixed into the solution to interpose themselves between graphene sheets; and
   the scCO$_2$ solution is allowed to escape constraining the fullerenes between sheets of graphene.

8. The method of claim 1, wherein energy is applied by,
   functionalizing the attachment points between the fullerenes and the first and second graphene sheets with tether molecules to add chemical energy.

9. The method of claim 8, wherein functionalization comprises,
   attaching a first tether molecule to each fullerene;
   attaching a second tether molecule to the graphene sheet at each attachment point;
   reacting the first and second tether molecules to release chemical energy in the formation of a third tether molecule at the attachment point.

10. The method of claim 8, wherein the tether molecules detach leaving behind only the open nanotubes conjoined between the graphene sheets.

11. The method of claim 10, wherein the additional energy is applied by one of thermal heating, hydrogen plasma, UV photon irradiation or electron or atomic ion radiation.

12. The method of claim 8, wherein functionalization lowers but does not overcome the barrier to break the carbon-carbon double bonds at the attachment points, further comprising applying additional energy to overcome the lowered barrier.

13. The method of claim 1, wherein at least two layers of multiple fullerenes are constrained between at least three alternating layers of graphene sheets.

14. The method of claim 13, wherein the energy is applied simultaneously to all layers to form the pillared graphene.

15. The method of claim 13, wherein sub-structures each comprising one layer of fullerenes constrained between a pair of graphene sheets are fabricated, one or more layers of multiple fullerenes are constrained between alternating sub-structures and energy is applied to form open nanotubes conjoined between graphene sheets of the sub-structures.

16. The method of claim 13, wherein a first layer comprises a substantially uniform composition of a first type of fullerene and a second layer comprises a substantially uniform composition of a second type of fullerene, said first type and said second type being different.

17. The method of claim 13, further comprising varying an isotope composition of at least one of the graphene sheets.

18. The method of claim 13, further comprising doping the graphene or fullerenes with a dopant.

19. A method of pillared graphene fabrication, comprising:
   alternating two or more layers of graphene sheets and one or more layers of fullerenes to form a protostructure having a total Gibbs Free Energy (GFE), each said layer of fullerenes constrained between a pair of graphene sheets at attachment points, said fullerenes comprising carbon-carbon double bonds that present an energy barrier to reorganization of the protostructure to a lower GFE;
   functionalizing the attachment points between the fullerenes and the graphene sheets in the protostructure with tether molecules to add chemical energy to lower the energy barrier at the attachment points; and
   applying additional energy to the protostructure to overcome the lowered energy barrier and break carbon-carbon bonds and open holes in the fullerenes and the graphene sheets at the attachment points and chemically reform carbon-carbon bonds between the fullerenes and the graphene sheets around the perimeter of the holes and reorganize carbon-carbon bonds within the fullerenes to form open nanotubes that are conjoined between the graphene sheets to form a stable unitary cylindrical pillared graphene nanostructure having a lower total GFE than the protostructure.

20. The method of claim 19, further comprising setting a spacing between attachment points by either chemically attaching spacer molecules between fullerenes or creating a periodic electric potential in at least one of the graphene sheets.

21. A method of pillared graphene fabrication, comprising:
   alternating three or more layers of graphene sheets and two or more layers of fullerenes to form a protostructure having a total Gibbs Free Energy (GFE), each said layer of fullerenes constrained between a pair of graphene sheet layers at attachment points, said fullerenes comprising carbon-carbon double bonds that present an energy barrier to reorganization of the protostructure to a lower GFE; and applying energy to the protostructure to overcome the energy barrier and break carbon-carbon bonds and open holes in the fullerenes and the graphene sheets at the attachment points and chemically reform carbon-carbon bonds between the fullerenes and the graphene sheets around the perimeter of the holes and reorganize carbon-carbon bonds within the fullerenes to form open nanotubes that are conjoined between the graphene sheets to form a stable unitary cylindrical pillared graphene nanostructure having a lower total GFE than the protostructure.

* * * * *